(12) United States Patent
Kim et al.

(10) Patent No.: US 8,480,062 B2
(45) Date of Patent: Jul. 9, 2013

(54) ACTIVATED HINGE-JOINT

(75) Inventors: SooWoong Kim, Flower Mound, TX (US); Gil Jong Kim, Seoul (KR); Ian G. Buttridge, Garland, TX (US); Michael J. Binkley, Glenn Heights, TX (US)

(73) Assignee: GTC Technology US, LLC, Houston, TX (US)

( * ) Notice: Subject to any disclaimer, the term of this patent is extended or adjusted under 35 U.S.C. 154(b) by 372 days.

(21) Appl. No.: 12/775,895

(22) Filed: May 7, 2010

(65) Prior Publication Data

US 2010/0288624 A1 Nov. 18, 2010

Related U.S. Application Data

(60) Provisional application No. 61/178,676, filed on May 15, 2009.

(51) Int. Cl.
*B01F 3/04* (2006.01)

(52) U.S. Cl.
USPC .................. 261/114.1; 261/114.4; 261/114.5

(58) Field of Classification Search
USPC ........... 261/114.1, 114.2, 114.3, 114.4, 114.5
See application file for complete search history.

(56) References Cited

U.S. PATENT DOCUMENTS

| | | | |
|---|---|---|---|
| 2,582,826 A | 1/1952 | Glitsch | |
| 2,718,901 A | 9/1955 | Nutter | |
| 2,752,229 A | 6/1956 | Brown et al. | |
| 2,787,453 A | 4/1957 | Hibshman et al. | |
| 2,853,281 A | 9/1958 | Hibshman et al. | |
| 2,903,251 A | 9/1959 | Thrift | |
| 2,951,691 A | 9/1960 | Nutter | |
| 3,039,751 A | 6/1962 | Versluis | |
| 3,146,280 A | 8/1964 | Forgrieve | |
| 3,233,708 A * | 2/1966 | Glitsch | 52/483.1 |
| 3,245,669 A | 4/1966 | Huggins et al. | |
| 3,282,576 A | 11/1966 | Bruckert at al. | |
| 3,287,004 A | 11/1966 | Nutter | |
| 3,338,566 A | 8/1967 | Kittel | |
| 3,399,871 A | 9/1968 | Bon | |
| 3,463,464 A | 8/1969 | Nutter et al. | |
| 3,729,179 A | 4/1973 | Keller | |
| 3,759,494 A | 9/1973 | Axelrod et al. | |
| 3,959,419 A | 5/1976 | Kitterman | |
| 4,120,919 A * | 10/1978 | McClain | 261/114.5 |
| 4,133,852 A | 1/1979 | DiNicolantonio et al. | |
| 4,174,363 A | 11/1979 | Bruckert | |

(Continued)

OTHER PUBLICATIONS

Kister, Henry Z., "Distillation Design", Ch. 6, pp. 265, 296, 331, 299-301; Ch. 7, pp. 382-394; Ch. 9, pp. 537-554, McGraw-Hill, 1992.*

(Continued)

*Primary Examiner* — Charles Bushey
(74) *Attorney, Agent, or Firm* — Winstead PC

(57) ABSTRACT

A fractionation tray for use in a process column. The fractionation tray is of a type where a first fluid flows downwardly from a downcomer onto the fractionation tray and across the fractionation tray in a first direction. A second fluid flows upwardly through the fractionation tray for interaction with the first fluid. The fractionation tray includes an upper tray section, a lower tray section that is operable to removably engage the upper tray section, a joint region which includes an area of overlap between the upper tray section and the lower tray section. The joint region allows passage of the second fluid therethrough.

35 Claims, 10 Drawing Sheets

U.S. PATENT DOCUMENTS

| | | |
|---|---|---|
| 4,201,626 A | 5/1980 | Asdigian |
| 4,207,174 A | 6/1980 | Christman |
| 4,247,521 A | 1/1981 | Forte et al. |
| 4,275,021 A | 6/1981 | Kirkpatrick et al. |
| 4,374,786 A | 2/1983 | McClain |
| 4,499,035 A | 2/1985 | Kirkpatrick et al. |
| 4,504,426 A | 3/1985 | Chuang et al. |
| 4,519,960 A | 5/1985 | Kitterman et al. |
| 4,528,068 A | 7/1985 | Fiocco et al. |
| 4,543,219 A | 9/1985 | Yamato et al. |
| 4,550,000 A | 10/1985 | Bentham |
| 4,597,916 A | 7/1986 | Chen |
| 4,603,022 A | 7/1986 | Yoneda et al. |
| 4,604,247 A | 8/1986 | Chen et al. |
| 4,710,326 A | 12/1987 | Seah |
| 4,729,857 A | 3/1988 | Lee et al. |
| 4,816,191 A | 3/1989 | Berven et al. |
| 4,842,778 A | 6/1989 | Chen et al. |
| 4,855,089 A | 8/1989 | Michels |
| 4,909,967 A | 3/1990 | Binkley et al. |
| 4,956,127 A | 9/1990 | Binkley et al. |
| 4,981,265 A | 1/1991 | Buhlmann |
| 5,051,214 A | 9/1991 | Chen et al. |
| 5,098,615 A | 3/1992 | Resetarits |
| 5,106,556 A | 4/1992 | Binkley et al. |
| 5,120,474 A | 6/1992 | Binkley et al. |
| 5,147,584 A | 9/1992 | Binkley et al. |
| 5,164,125 A | 11/1992 | Binkley et al. |
| 5,192,465 A | 3/1993 | Petrich et al. |
| 5,192,466 A | 3/1993 | Binkley |
| 5,277,848 A | 1/1994 | Binkley et al. |
| 5,453,222 A | 9/1995 | Lee et al. |
| 5,468,425 A | 11/1995 | Nutter |
| 5,547,617 A | 8/1996 | Lee et al. |
| 5,573,714 A | 11/1996 | Monkelbaan et al. |
| 5,762,834 A | 6/1998 | Hauser et al. |
| 5,783,119 A | 7/1998 | Ulrich et al. |
| 5,895,608 A | 4/1999 | Lee et al. |
| 5,906,773 A | 5/1999 | Hausch et al. |
| 5,911,922 A | 6/1999 | Hauser et al. |
| 5,921,109 A | 7/1999 | Billingham et al. |
| 6,053,484 A | 4/2000 | Fan et al. |
| 6,068,244 A | 5/2000 | Burton et al. |
| 6,089,550 A | 7/2000 | Petschauer et al. |
| 6,113,079 A | 9/2000 | Urbanski et al. |
| 6,145,816 A | 11/2000 | Chuang et al. |
| 6,224,043 B1 | 5/2001 | Fan et al. |
| 6,293,526 B1 | 9/2001 | Fischer et al. |
| 6,422,539 B1 | 7/2002 | Burton et al. |
| 6,502,806 B2 | 1/2003 | Richardson |
| 6,540,213 B2 | 4/2003 | Bachmann et al. |
| 6,575,437 B2 | 6/2003 | Fischer et al. |
| 6,588,736 B1 | 7/2003 | Chuang et al. |
| 6,592,106 B1 | 7/2003 | Eaton, Jr. |
| 6,629,687 B1 * | 10/2003 | Gage .................... 261/114.5 |
| 6,722,639 B2 | 4/2004 | Ender et al. |
| 6,739,585 B1 | 5/2004 | Urbanski et al. |
| 6,799,752 B2 | 10/2004 | Wu et al. |
| 6,962,661 B2 | 11/2005 | Northup, Jr. et al. |
| 7,045,103 B2 | 5/2006 | McDougald et al. |
| 7,052,654 B2 | 5/2006 | McDougald et al. |
| 7,078,002 B2 | 7/2006 | Van Vliet et al. |
| 7,125,004 B2 | 10/2006 | Dollie et al. |
| 7,235,158 B2 * | 6/2007 | Matsumoto et al. ............. 203/8 |
| 7,270,315 B2 * | 9/2007 | Burton et al. ............. 261/114.1 |
| 7,556,734 B2 | 7/2009 | Lee et al. |
| 7,712,728 B2 | 5/2010 | Kehrer |
| 7,896,039 B2 | 3/2011 | Bachmann et al. |
| 8,006,716 B2 | 8/2011 | Zhang et al. |
| 2002/0041040 A1 | 4/2002 | Fischer et al. |
| 2003/0067085 A1 | 4/2003 | Shakur et al. |
| 2004/0182013 A1 | 9/2004 | Kehrer |
| 2007/0126134 A1 | 6/2007 | Xu et al. |
| 2007/0295591 A1 | 12/2007 | Mosler |
| 2008/0245651 A1 | 10/2008 | Werlen et al. |
| 2008/0277260 A1 | 11/2008 | Binkley et al. |
| 2012/0024977 A1 | 2/2012 | Buttridge et al. |
| 2012/0118399 A1 | 5/2012 | Binkley et al. |
| 2012/0211347 A1 | 8/2012 | Kim et al. |
| 2012/0300577 A1 | 11/2012 | Buttridge et al. |

OTHER PUBLICATIONS

Glitsch, Inc., "Ballast Tray Design Manuel", Bulletin 4900, Sixth Edition, (40 pages).
Young, Lee W., "International Search Report" for the International Application PCT/IB 11/02695 as mailed Apr. 17, 2012. (4 pages).
Glitsch, Inc., "Ballast Tray Design Manuel", Bulletin 4900, Sixth Edition, 1993, (40 pages).
Axens IFP Group Technologies, "Equiflow Reactor Internals for Optimal Catalyst Utilization", Axens Process Licensing, Jun. 2006, 4 pages.
GTC Technology, "GT-BenZap Technology Licensing". Engineered to Innovate, 2009, 2 pages.
Shell, "Shell Global Solutions' Portfolio for Reactor Engineering Technology", Shell Global Solutions, 2002, 3 pages.
Binkley, Michael, U.S. Appl. No. 12/408,333, filed Mar. 30, 2009.
Buttridge, Ian G. U.S. Appl. No. 12/418,189, filed Apr. 3, 2009.
Buttridge, Ian G., U.S. Appl. No. 13/564,881, filed Aug. 2, 2012.

* cited by examiner

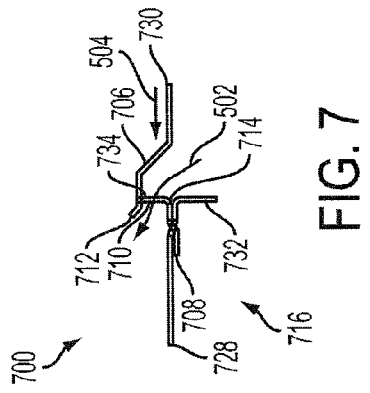
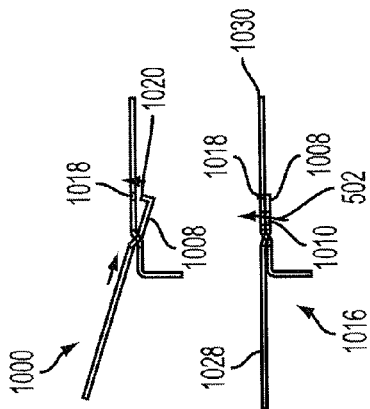

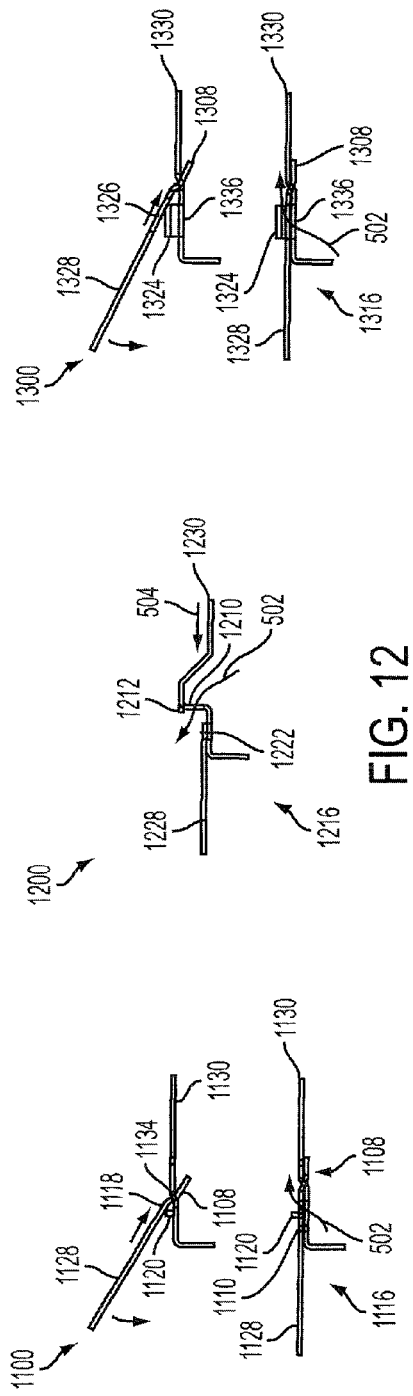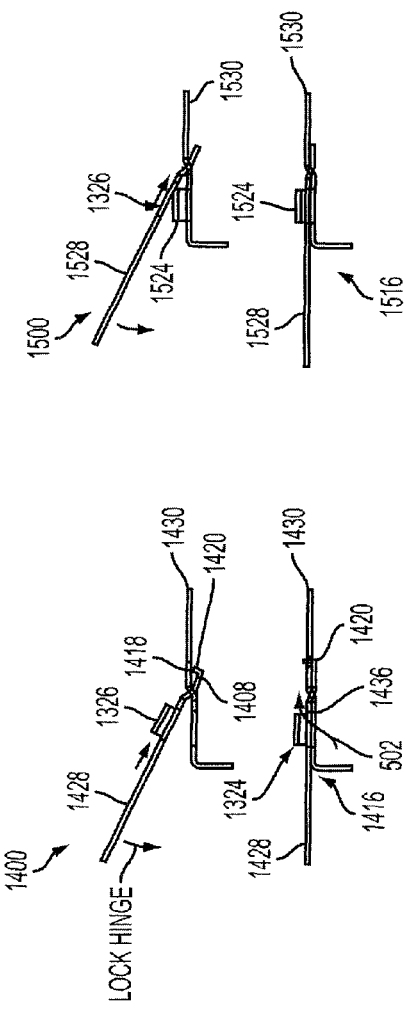

ACTIVATED HINGE-JOINT

CROSS-REFERENCE TO RELATED APPLICATIONS

This application claims priority from, and incorporates by reference, U.S. Provisional Patent Application No. 61/178,676, filed May 15, 2009. In addition, this application incorporates by reference the disclosures of U.S. patent application Ser. No. 12/408,333, filed Mar. 20, 2009 and U.S. patent application Ser. No. 12/109,781, filed Apr. 25, 2008.

BACKGROUND OF THE INVENTION

1. Field of the Invention

The present invention relates to mass-transfer trays for chemical process columns and, more particularly, but not by way of limitation, to improved hinge joints in mass transfer trays for higher efficiency and increased capacity operation.

2. History of Related Art

Distillation columns are utilized to separate selected components from a multicomponent stream. Generally, such contact columns utilize either trays, packing, or combinations thereof. In certain years the trend has been to replace so-called "bubble caps" by sieve and valve trays in most tray column designs.

Successful fractionation in the column is dependent upon intimate contact between heavier fluids and lighter fluids. Some contact devices, such as trays, are characterized by relatively high pressure drop and relatively high fluid hold-up. One type of contact apparatus utilizes fluid in the vapor phase to contact fluid in the liquid phase and has become popular for certain applications. Another type of contact apparatus is high-efficiency packing, which is energy efficient because it has low pressure drop and low fluid hold-up. However, these very properties at times make columns equipped with structured packing difficult to operate in a stable, consistent manner. Moreover, many applications simply require the use of trays.

Addressing now select flow designs, a particularly effective tray in process columns is a sieve tray. The sieve tray is constructed with a large number of apertures formed in a bottom surface. The apertures permit the ascending lighter fluid to flow into direct engagement with the heavier fluid that is flowing across the sieve tray from the downcomer described above. When there is sufficient lighter-fluid flow upwardly through the sieve tray, the heavier fluid is prevented from running downwardly through the apertures (referred to as "weeping"). A small degree of weeping is normal in trays while a larger degree of weeping is detrimental to the capacity and efficiency of a tray.

When a vapor comprises the lighter fluid and a liquid comprises the heavier fluid, there are specific performance issues. Certain performance and design issues are seen in the publication "Distillation Tray Fundamentals", M. J. Lockett, Cambridge University Press, 1986. Other examples are seen in several prior art patents, which include U.S. Pat. No. 3,338,566 issued to W. Kittel, U.S. Pat. No. 3,729,179 assigned to Fractionation Research, Inc., U.S. Pat. No. 4,275,021 assigned to Union Carbide Corporation and U.S. Pat. No. 4,603,022 issued to Mitsubishi Jukogyo Kabushiki Kaisha of Tokyo, Japan. U.S. Pat. No. 4,499,035 assigned to Union Carbide Corporation teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating gas ascension therethrough.

U.S. Pat. No. 4,550,000 assigned to Shell Oil Company teaches an apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances in tray designs improve efficiency within the confines of prior art structures. Likewise, U.S. Pat. No. 4,543,219 assigned to Nippon Kayaku Kabushiki Kaisha of Tokyo, Japan teaches a baffle-tray tower. The operational parameters of high gas-liquid contact efficiency and the need for low pressure loss are set forth. Such references are useful in illustrating the need for high efficiency lighter fluid/heavier fluid contact in tray process towers. U.S. Pat. No. 4,504,426 issued to Karl T. Chuang et. al. and assigned to Atomic Energy of Canada Limited is yet another example of gas-liquid contacting apparatus.

Several prior patents have specifically addressed the tray design and the apertures in the active tray deck area itself. For example, U.S. Pat. No. 3,282,576 to Bruckert et al. discloses increasing tray activity by forming sloped walls at an inlet region of the tray and placing perforations on the sloped walls. By way of further example, U.S. Pat. No. 2,787,453, a 1957 patent, and U.S. Pat. No. 2,853,281, a 1958 patent, disclose directional tab-style fractionating trays that promote tray activity. Furthermore, U.S. Pat. No. 3,146,280 is a 1964 patent teaching a directional float valve. The gas is induced to discharge from the inclined valve in a predefined direction depending on the orientation of the valve in the tray deck. In addition, U.S. Pat. No. 5,098,615 to Resetarits discloses raised, perforated domes and raised, perforated channels to initiate froth and to direct fluids for improved contact.

Referring now to FIGS. 1A and 1B, a fractionation tray generally includes two or more tray sections 2 and 4 which overlap to form a joint region 5. As illustrated in FIG. 1A, many conventional methods contemplate overlapping the tray sections 2 and 4 and securing the tray sections 2 and 4 with a fastener 6 such as a bolt 6. As illustrated in FIG. 1B, some conventional methods contemplate tray sections 2 and 4 that are operable to interlock and be secured to each other without the need for fasteners. In either case, the joint region 5 is generally inactive.

Several prior patents have also specifically addressed the tray design relative to traditionally inactive areas of the tray. As illustrated in FIG. 1C, trays generally include two or more tray sections (2 and 4) that are traditionally assembled using a clamping means such as a bolt 6. For example, U.S. Pat. No. 2,582,826 to Glitsch, U.S. Pat. No. 2,903,251 to Thrift, U.S. Pat. No. 3,039,751 to Versluis, and U.S. Pat. No. 4,174,363 to Bruckert each disclose various applications of bolts in assembling trays. There have been a number of variations on the utilization of bolts in the assembly of trays. For example, U.S. Pat. No. 4,133,852 to DiNicolantonio et al. discloses welding U-shaped hinges to the trays while being bolted to a major beam. The area of overlap between tray sections, referred to herein as a joint region, is traditionally completely inactive.

More recently, as illustrated in FIG. 1D, U.S. Pat. No. 5,468,425 to Nutter discloses placing a vapor opening 7 in a joint region 5 between the two trays 2 and 4. Other improvements relative to the joint region have also been attempted. As shown in FIG. 1E, U.S. Pat. No. 6,068,244 and U.S. Pat. No. 6,422,539, both to Burton et al., teach forming trays through use of interlocking tray panels 1 and 3 and, moreover, placing a movable valve 8 in the joint region 5. As shown in FIG. 1F, U.S. Pat. No. 6,592,106 to Eaton teaches incorporating a locking mechanism 9 into the joint region 5 between the trays 2 and 4. The above-referenced patents and statements with regard to the related art are set forth for purposes of understanding the intricacies of the design considerations in contract-tray assembly and method configurations. It would be an advantage to provide a method of and apparatus for enhanced fluid flow manifesting increased efficiency through additional methodologies for activating a joint region between two or more tray sections.

Various embodiments are described herein by way of example as being applied to liquid-vapor fractionation processes. However, one skilled in the art will recognize that the same embodiments disclosed herein could also be applied to liquid-liquid extraction processes.

SUMMARY OF THE INVENTION

In one embodiment, a fractionation tray for use in a process column of a type wherein a first, heavier fluid flows downwardly from a downcomer onto a tray and thereacross in a first direction through which a second, lighter fluid (which may be a gas) flows upwardly therethrough for interaction and mass transfer with the heavier fluid before passing therefrom. The fractionation tray includes a first tray section and a second tray section. The first tray section has a plurality of extended regions disposed on an end thereof. The second tray section has a plurality of slots for receiving the plurality of extended regions in order to join the first tray section with the second tray section in a joint region, the joint region being defined by an area of overlap between the first tray section and the second tray section. A ridge is formed in the joint region with one or more apertures disposed thereon for allowing the ascending lighter fluid to ingress into a surface of the fractionation tray.

In one embodiment, a fractionation tray for use in a process column. The fractionation tray is of a type where a first fluid flows downwardly from a downcomer onto the fractionation tray and across the fractionation tray in a first direction. A second fluid flows upwardly through the fractionation tray for interaction with the first fluid. The fractionation tray includes an upper tray section, a lower tray section that is operable to removably engage the upper tray section, a joint region which includes an area of overlap between the upper tray section and the lower tray section. The joint region allows passage of the second fluid therethrough.

In another embodiment, a fractionation tray for use in a process column. The fractionation tray is of a type where a first fluid flows downwardly from a downcomer onto the fractionation tray and across the fractionation tray in a first direction. A second fluid flows upwardly through the fractionation tray for interaction with the first fluid. The fractionation tray includes a first tray section including at least one extended region, a second tray section including at least one slot for receiving the at least one extended region, a joint region comprising an area of overlap between the first tray section and the second tray section, and a ridge formed in the joint region including at least one aperture disposed thereon for allowing the second fluid to ingress into a surface of the fractionation tray.

In another embodiment, a fractionation tray for use in a process column. The fractionation tray is of a type where a first fluid flows downwardly from a downcomer onto the fractionation tray and across the fractionation tray in a first direction. A second fluid flows upwardly through the fractionation tray for interaction with the first fluid. The fractionation tray includes an upper tray section having a first plurality of slots disposed thereon and a lower tray section having a second plurality of slots disposed thereon. The lower tray section is operable to removably engage the upper tray section to form a joint region. The joint region includes an area of overlap between the upper tray section and the lower tray section. At least a portion of the first plurality of slots is aligned with at least a portion of the second plurality of slots thereby allowing the second fluid to ingress into a surface of the fractionation tray.

In another embodiment, a method for increasing efficiency of a fractionation tray. The method includes providing a process column having a tray disposed therein. The tray includes an upper tray section, a lower tray section, and a joint region defined by an area of overlap between the first tray section and the second tray section. The method further includes directing a heavier fluid across the tray in a first direction and activating the joint region by injecting a lighter fluid upwardly through at least one aperture disposed in the joint region.

BRIEF DESCRIPTION OF THE DRAWINGS

For a more complete understanding of the present invention and for further objects and advantages thereof, reference may now be had to the following description taken in conjunction with the accompanying drawings in which:

FIG. 5 is a side-view of an active joint region according to an exemplary embodiment;

FIG. 6 is a side-view of an active joint region according to an exemplary embodiment;

FIG. 7 is a side-view of an active joint region according to an exemplary embodiment;

FIG. 8 is a side-view of an active joint region according to an exemplary embodiment;

FIG. 9 is a side-view of an active joint region according to an exemplary embodiment;

FIG. 10 is a side-view of an active joint region according to an exemplary embodiment;

FIG. 11 is a side-view of an active joint region according to an exemplary embodiment;

FIG. 12 is a side-view of an active joint region according to an exemplary embodiment;

FIG. 13 is a side-view of an active joint region according to an exemplary embodiment;

FIG. 14 is a side-view of an active joint region according to an exemplary embodiment;

FIG. 15 is a side-view of an active joint region according to an exemplary embodiment;

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1A:
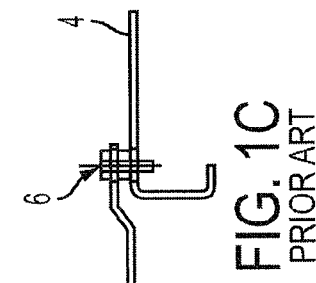
FIGS. 1A-1F are side views of prior art joint regions.
Figure 1D:
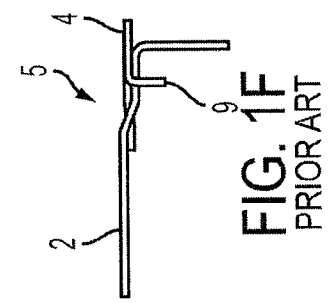
Figure 1B:
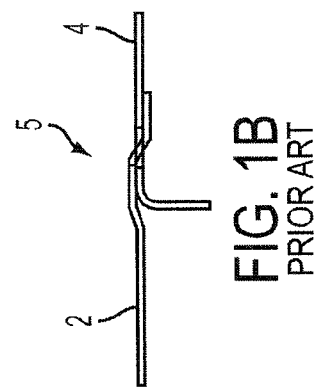
Figure 1E:
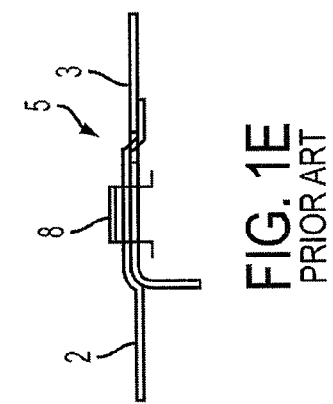
Figure 1C:
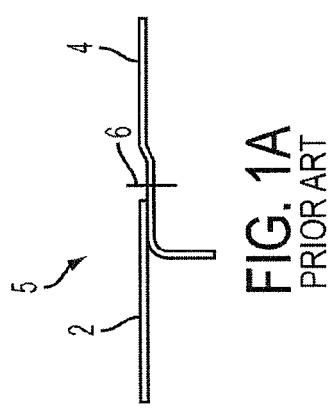
Figure 1F:
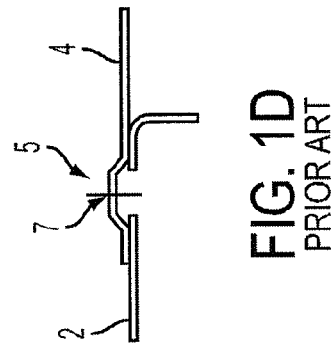
Figure 1G:
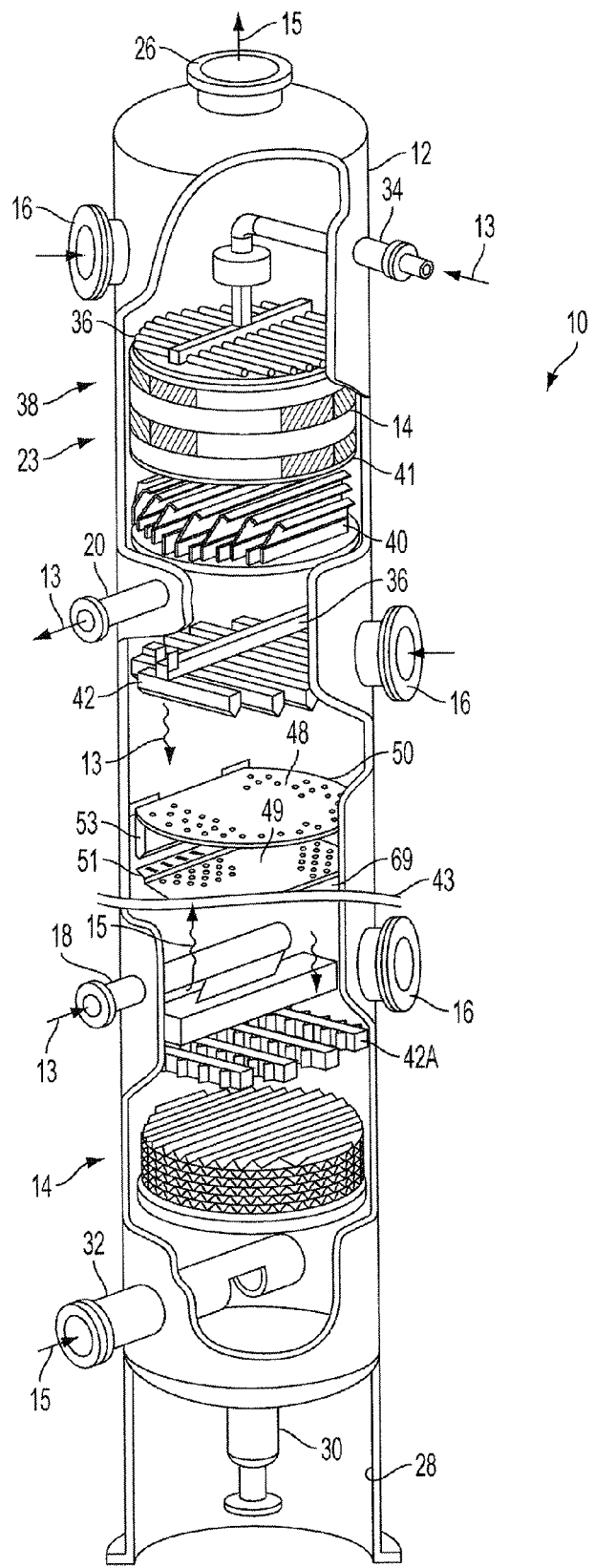
FIG. 1G is a perspective view of a prior art packed column with various sections cut away for illustrating, diagrammatically, a variety of internal components.

Referring now to FIG. 1G, there is shown a perspective view of a prior art packed column with various sections cut away for illustrating, diagrammatically, a variety of internal component. The exchange column 10 of FIG. 1G comprises a cylindrical tower 12 having a plurality of packing bed layers 14 and trays disposed therein. A plurality of manways 16 are likewise constructed for facilitating access to an internal region of the cylindrical tower 12. Also provided are a side-stream draw-off line 20, a heavier-fluid side-stream-input feed line 18, and a side-stream lighter-fluid feed line (or reboiler-return line) 32. A reflux-return line 34 is provided atop the exchange column 10.

Still referring to FIG. 1G, in operation, a heavier fluid 13 is fed into the exchange column 10 through the reflux-return line 34 and side-stream-input feed line 18. The heavier fluid 13 flows downwardly through the exchange column 10 and ultimately leaves the column 10 either at the side-stream draw-off line 20, or at a bottom-stream draw-off line 30. In the case of a vapor-liquid tower, the heavier fluid 13, during its downward flow, is depleted of some material which evaporates from it as it passes through the trays and packing beds, and is enriched or added to by material which condenses into it out of the lighter fluid stream.

Still referring to FIG. 1G, the exchange column 10 is diagrammatically cut in half for purposes of clarity. In this illustration, the exchange column 10 includes a lighter-fluid outlet in overhead line 26 disposed atop the cylindrical tower 12 and a lower skirt 28 disposed in the lower region of the cylindrical tower 12 around a bottom stream-draw-off line 30 coupled to a reboiler (not explicitly shown). The reboiler-return line 32 is shown disposed above the skirt 28 for recycling lighter fluid therein upwardly through the trays and/or packing bed layers 14. Reflux from condensers is provided in an upper tower region 23 through the reflux-return line 34 wherein reflux is distributed throughout a distributor 36 across an upper packing bed 38. It may be seen that the upper packing bed 38 is of the structured packing variety. The regions of the exchange column 10 beneath the upper packing bed 38 are shown for the purpose of illustration and include a heavier fluid collector 40 disposed beneath a support grid 41 in support of the upper packing bed 38. The exchange column 10 is presented with a cut-line 43 for illustrating the fact that the tower internals arrangement is diagrammatical only and is provided for referencing various component arrays therein.

Referring still to FIG. 1G, an assembly of a pair of trays 48 and 49 is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 and 49 of the type shown herein. In many instances, the pair of trays 48 and 49 are valve or sieve trays.

Referring still to FIG. 1G, the pair of trays 48 and 49 generally comprise a solid tray or deck having a plurality of apertures and are installed on support rings within the exchange column 10. In general, fractionation column trays come in two configurations: cross-flow and counter-flow. In cross-flow trays, lighter fluid ascends through apertures in the tray surface and contacts heavier fluid moving across the tray, through an "active" area thereof. In the active area, the heavier fluid and the lighter fluid interact and fractionation occurs. The heavier fluid is directed onto the tray by means of a vertical channel from the tray above. This vertical channel is referred to as an Inlet Downcomer. The heavier fluid moves across the tray and exits through a similar channel referred to as an Exit Downcomer. The location of the downcomers determines the flow pattern of the heavier fluid. If there are two Inlet Downcomers and the heavier fluid is split into two streams over each tray, it is called a two pass tray. If there is only one Inlet and one outlet Downcomer on opposite sides of the tray, it is called a single pass tray. For two or more passes, the tray is often referred to as a Multipass Tray. The number of passes generally increases as the required (design) flow rate increases. It is the active area of the tray, however, which is of critical concern.

Valve trays are shown in FIG. 1G. Such trays comprise plates which may be, for example, punched or slotted in construction. Within the scope of the invention and for the purposes of the description of various embodiments herein, the configuration referred to as a "valve" includes anything at an intersection of and facilitating contact between a lighter fluid and a heavier fluid. The lighter fluid and the heavier fluid engage at or along the tray and, in some assemblies, are permitted to flow through the same openings in a counter-current flow arrangement. Optimally, the lighter-fluid flows and the heavier-fluid flows reach a level of stability. With the utilization of appropriate downcomers, to be described in more detail below, this stability may be achieved with a relatively low flow rate permitting the ascending lighter fluid to interact with the descending heavier fluid. In some embodiments, no downcomers are used and the lighter fluid and the heavier fluid use the same openings, alternating as the respective pressures change.

In a typical embodiment, cross-flow valve trays 48 and 49 and downcomers 53 and 69 are illustrated. Tray 48 is constructed with a plurality of floating valves. Tray 49 also illustrates a raised inlet section 51 beneath downcomer 53, which is substantially planar, formed with a plurality of apertures, and which may include a series of momentum deflector barriers, as will be described below. The raised inlet area is described in more detail in U.S. Pat. No. 4,956,127 to Binkley. Corrosion is another consideration in designing packed towers and for the selection of the material, design, and the fabrication of the tower internals.

Figure 2:
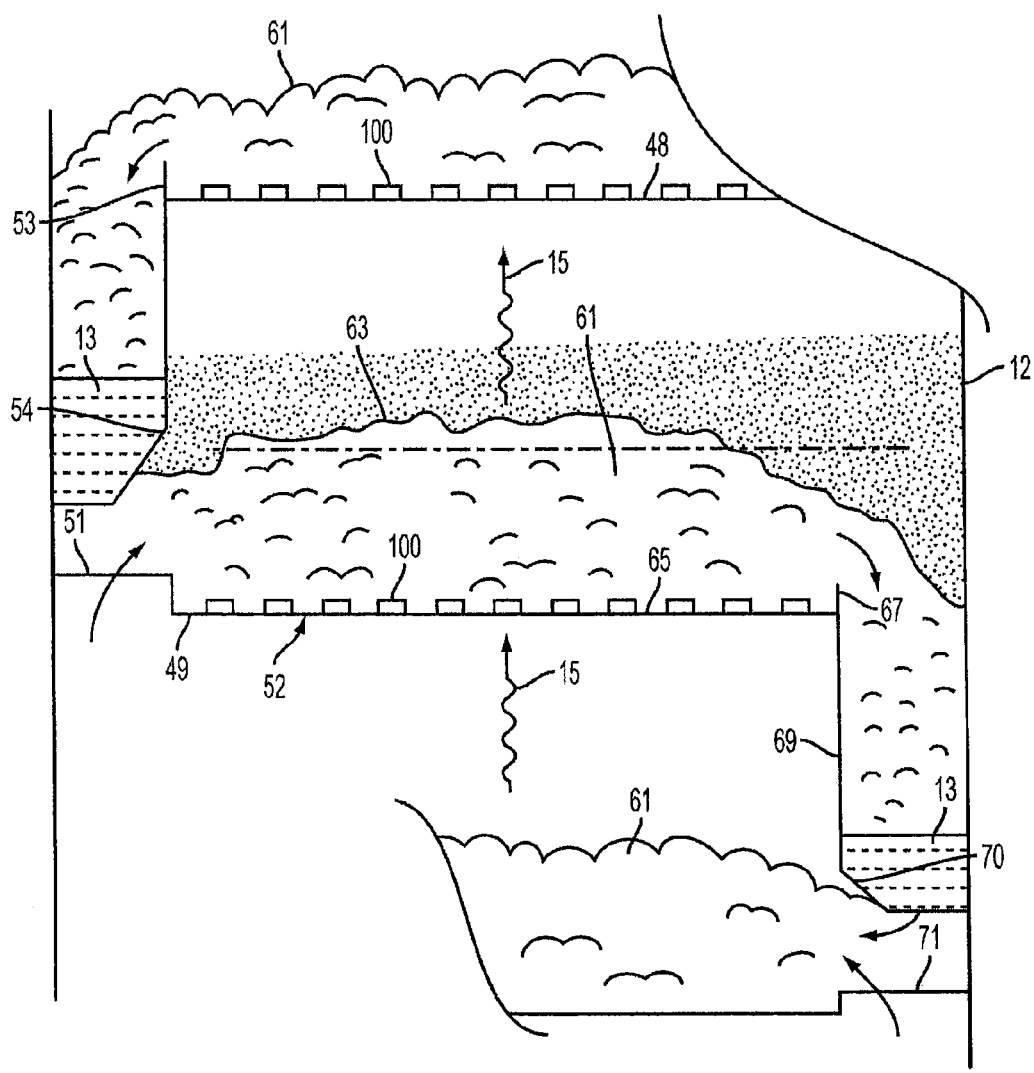
FIG. 2 is a diagrammatic, side-elevational, cross-sectional view of a prior art downcomer-tray assembly secured within a process tower and illustrating the flow of heavier fluid and lighter fluid thereacross.

Referring now to FIG. 2, there is shown a diagrammatic, side-elevational, cross-sectional view of a prior art downcomer-tray assembly secured within a process tower. In a typical embodiment, an upper tray 48 comprises a first valved panel. The lower tray 49 is also of generally planar construction across a central active area 52, having a plurality of valves 100 mounted thereon, disposed therein, or formed therefrom as diagrammatically shown. The heavier fluid 13 travels down a downcomer 53 having a tapered or mitered bottom section 54, from the tray 48 disposed thereabove. The mitered bottom section 54 of the downcomer 53 provides a clearance angle for lighter-fluid flow from the active inlet area, which clearance angle affords a horizontal flow vector to the lighter fluid 15 vented through raised inlet section 51. The heavier fluid 13 engages the lighter fluid 15 discharged from the raised inlet section 51 beneath the downcomer 53.

Still referring to FIG. 2, froth 61 extends with a relatively uniform height, shown in phantom by line 63 across the width of the tray 49 to an opposite end 65 where a weir 67 is established for maintaining the froth height 63. The accumulated froth at this point flows over the top of the weir 67 into an associated downcomer 69 that carries the froth downwardly into a mitered region 70 where the heavier fluid accumulates and disperses upon an active inlet region 71 therebeneath. Again the active inlet region 71 is shown herein diagrammatically for purposes of illustration only. As stated herein, the area of holes and perforations for a single cross-flow plate establish the active length of the plate and the zone in which the froth 61 is established. It should be noted that the present invention would also be applicable to multiple downcomer configurations, wherein the downcomers and raised, active inlet areas may be positioned in intermediate areas of the trays as also described below. By increasing the total active area of the raised inlet section 51 and 71, greater capacity and efficiency is achieved. It is also the manner of flow of the heavier fluid 13 across the tray 49 which is critical to tray efficiency.

Figure 3:
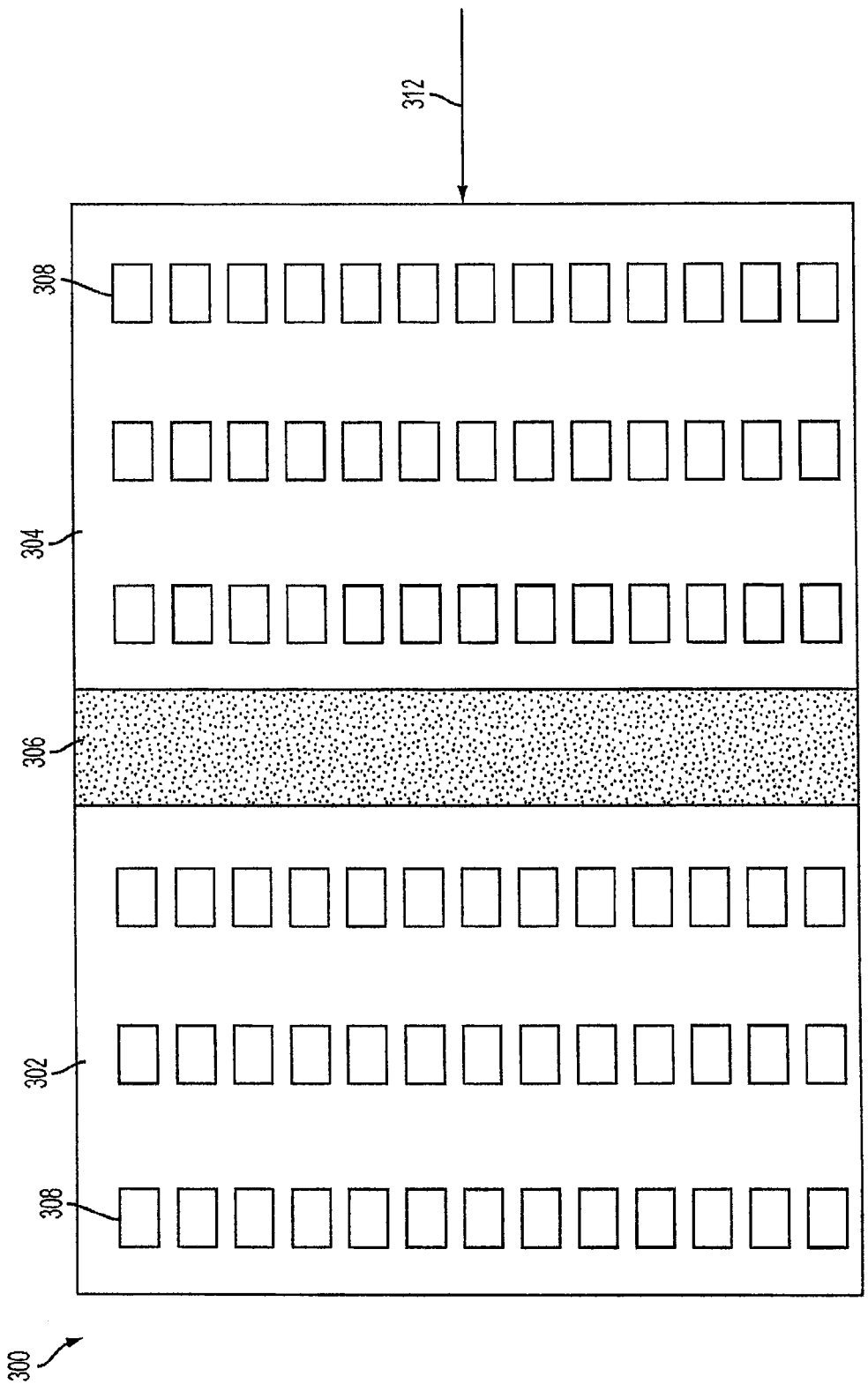
FIG. 3 is a top-plane, diagrammatic view of a tray illustrating an inactive region in conventional trays.

Referring now to FIG. 3, there is shown a top-plane diagrammatic view of a tray illustrating an inactive region in conventional trays. As will be apparent to one of ordinary skill in art, a tray may be formed of, for example, two or more tray sections joined together. In a typical embodiment, the tray 300 includes first and second tray sections 302, 304 that overlap and are joined in a joint region 306. As used herein, the term "joint region" refers to an area of overlap between the first and second tray sections 302, 304. The joint region 306 is generally inactive because it prevents interaction between the heavier fluid 312 and lighter fluid. However, in various embodiments, the joint region 306 may be activated by allowing ascending lighter fluid to ingress into the tray 300 and interact with the heavier fluid 312. In this manner, tray efficiency and capacity may be increased. A plurality of valves 308 are disposed on the first and second tray sections 302, 304.

As used herein, the term "inactive" refers to a region of a tray or a tray section wherein no interaction between the heavier fluid and the lighter fluid occurs. In a typical embodiment, the term "active" refers to a region of a tray or tray section that allows for passage of the lighter fluid therethrough for interaction and mass transfer with the heavier fluid. In a typical embodiment, the term "activating" refers to enabling passage of the lighter fluid through a portion of a tray or tray section so as to allow interaction and mass transfer with the heavier fluid. The term "efficiency" or "tray efficiency" refers to optimum interaction of the lighter fluid and the heavier fluid on the total surface of the tray to achieve maximum separation of the selected components.

Figure 4A:
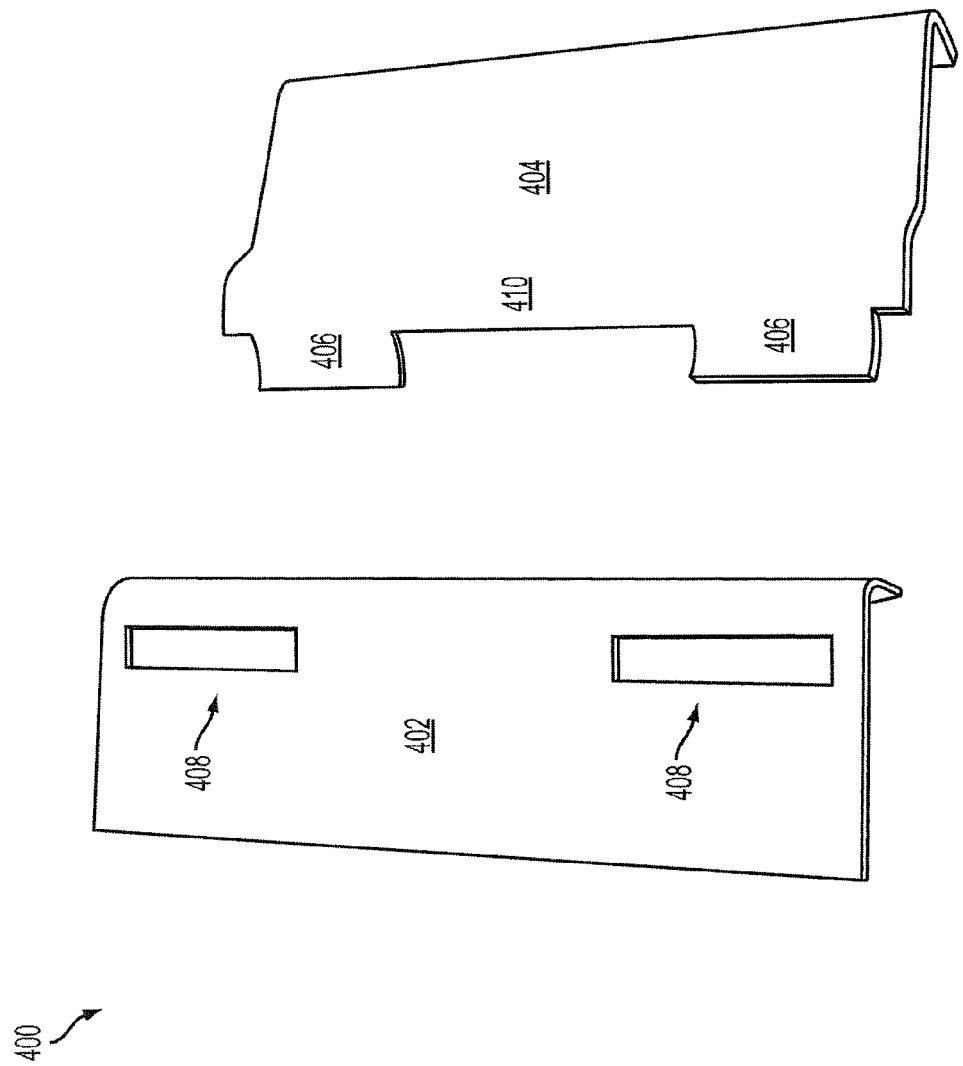
FIG. 4A is a top plan view of a tray prior to construction according to an exemplary embodiment.

Referring now to FIG. 4A, there is shown a top plan view of a tray prior to assembly according to an exemplary embodiment. In a typical embodiment, a tray 400 may be, for example, a valve tray, a sieve tray, or the like. A first tray section 404 has disposed thereon at least one extended region 406 and a substantially arc-shaped ridge 410. In a typical embodiment, the at least one extended region 406 may be, for example, substantially U-shaped. Furthermore, in a typical embodiment, the at least one extended region 406 may comprise, for example, a finger, a protuberance, an extension, a processes, or other similar structure. A second tray section 402 includes at least one slot 408 that is configured to receive the at least one extended region 406. By way of example, FIG. 4A illustrates two extended regions 406 and two slots 408; however, one skilled in the art will recognize that any number of extended regions 406 and slots 408 may be present. Additionally, the at least one extended region 406 and the at least one slot 408 may be of various different shapes and orientations other than those illustrated in FIG. 4 as may be advantageous for specific applications. The first tray section 404 and the second tray section 402 are joined by inserting the at least one extended region 406 of the first tray section 404 into the at least one slot 408 of the second tray section 402 so that the at least one extended region 406 crosses into and becomes substantially flush with an underside of the second tray section 402.

Figure 4B:
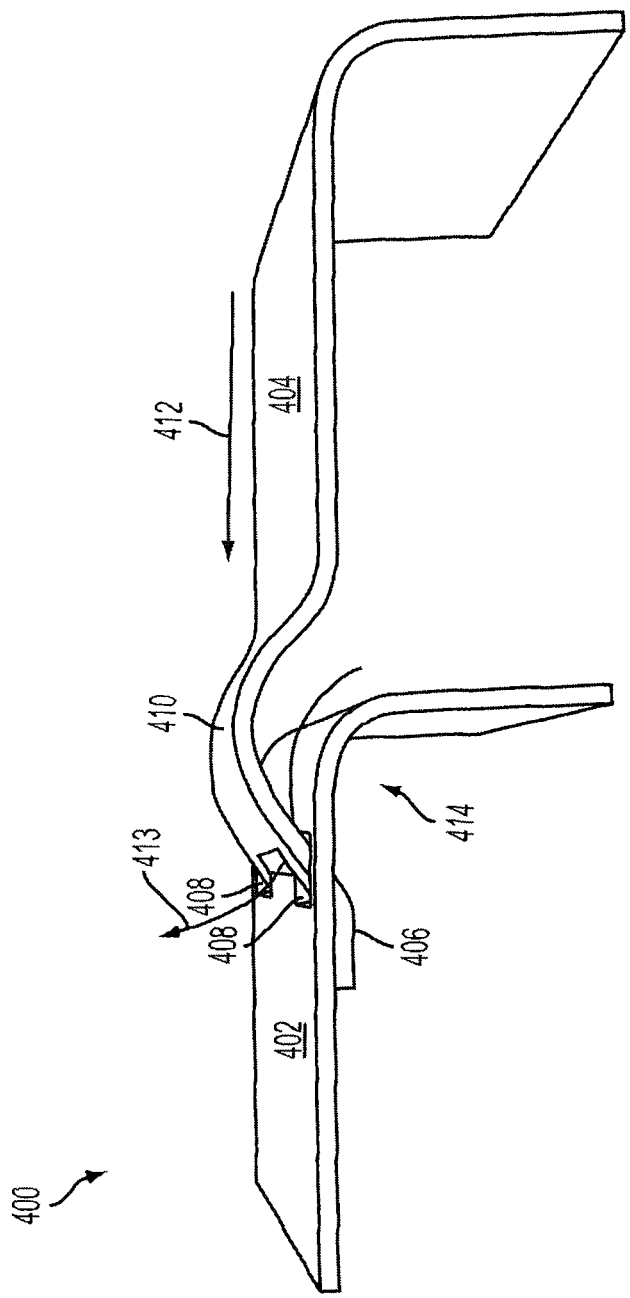
FIG. 4B is a side view of a tray after construction according to an exemplary embodiment.

Referring now to FIG. 4B, there is shown a side view of a tray after assembly according to an exemplary embodiment. In a typical embodiment, the first tray section 404 overlaps the second tray section 402 to form a joint region 414. A heavier fluid 412 engages and flows across the arc-shaped ridge 410. In various embodiments, as discussed in more detail below, a ridge such as, for example, the arc-shaped ridge 410 may be utilized to facilitate passage of a lighter 413 fluid from underneath the arc-shaped ridge 410 into the heavier fluid 412 flowing thereacross, thereby activating a joint region such as, for example, the joint region 414. In a typical embodiment, activating the joint region 414 refers to enabling the passage of the lighter fluid 413 through the joint region 414 so as to allow interaction and mass transfer with the heavier fluid 412. Although, by way of example, the arc-shaped ridge 410 is shown in FIGS. 4A and 4B, ridges of other shapes are also contemplated and will be apparent to one of ordinary skill in the art. For example, a ridge may also be square-shaped, triangular-shaped, or trapezoidal-shaped. Moreover, in alternate embodiments, multiple ridges may be included.

Referring now to FIG. 5, there is shown a side view of an active joint region according to an exemplary embodiment. In a typical embodiment, a tray 500 includes an active joint region 516 that may be formed by joining a first tray section 528 with a second tray section 530. A heavier fluid 504 flows downstream and across the tray 500 from the second tray section 530 towards the first tray section 528 as indicated. The second tray section 530, from upstream to downstream, is substantially planar until an arc-shaped ridge 506 is formed thereon. In a typical embodiment, an aperture 510 is formed on a downstream side of the arc-shaped ridge 506 to allow ascending lighter fluid 502 to ingress via the aperture 510 and activate the active joint region 516. In a typical embodiment, the aperture 510 may be of various sizes, shapes, and types including, for example, a slot or an orifice. The arc-shaped ridge 506 terminates in an extended region 508 in the active joint region 516. In a typical embodiment, the extended region 508 is utilized to join the second tray section 530 and the first tray section 528 in a manner similar to that described above with respect to FIGS. 4A and 4B. Although only a single extended region 508 is visible, in alternate embodiments, a plurality of extended regions 508 may be present and instrumental in forming the joint region 516. The first tray section 528, from downstream to upstream, is substantially planar and terminates in a truss 532 extending downwardly in the active joint region 516.

Still referring to FIG. 5, in operation, the heavier fluid 504 flowing across the tray 500 engages the arc-shaped ridge 506. The heavier fluid 504 thus may be interrupted in its flow, thereby facilitating interaction with the lighter fluid 502 as the heavier fluid 504 flows downstream of the arc-shaped ridge 506 to the aperture 510. In that way, the lighter fluid 502 interacts with the heavier fluid 504 flowing across the active joint region 516. In this manner, tray efficiency is increased.

Referring now to FIG. 6, there is shown a side view of an active joint region according to an exemplary embodiment. In a typical embodiment, a tray 600 includes an active joint region 616 that may be formed by joining a first tray section 628 with a second tray section 630. A heavier fluid 504 flows downstream and across the tray 600 from the second tray section 630 to the first tray section 628 as indicated. The second tray section 630, from upstream to downstream, is substantially planar until an arc-shaped ridge 506 is formed thereon. In a typical embodiment, an aperture 610 is formed on a downstream side of the arc-shaped ridge 506 to allow ascending lighter fluid 502 to ingress via the aperture 610 and activate the active joint region 616. In a typical embodiment, the aperture 610 may be of various sizes, shapes, and types including, for example, a slot or an orifice. In a typical embodiment, the second tray section 630 and the first tray section 628 are joined in a manner similar to that described above with respect to FIGS. 4A and 4B. The first tray section 628, from downstream to upstream, is substantially planar.

Still referring to FIG. 6, in a typical embodiment, the tray 600 additionally includes a tab 612 disposed on a top portion of the aperture 610. In a typical embodiment, the tab 612 extends substantially perpendicular to the aperture 610 and thus, via injection of the lighter fluid 502, enables additional momentum to be imparted to the heavier fluid 504 flowing across the active joint region 616 for added capacity. Similarly, the tab 612 may be used to apply a directional vector to the heavier fluid 504 in the interaction of the lighter fluid 502 with the heavier fluid 504 for better dispersion and increased efficiency. As discussed in more detail below, the tab 612 may be oriented at various angles relative to the aperture 610.

Referring now to FIG. 7, there is shown a side view of an active joint region according to an exemplary embodiment. In a typical embodiment, a tray 700 includes an active joint region 716 that may be formed by joining a first tray section 728 with a second tray section 730. The heavier fluid 504 flows downstream and across the tray 700 from the second tray section 730 to the first tray section 728 as indicated. The second tray section 730, from upstream to downstream, is substantially planar until a substantially trapezoidal ridge 706 is formed thereon. In a typical embodiment, an aperture 710 is formed on a downstream side 734 of the substantially trapezoidal ridge 706 to allow ascending lighter fluid 502 to ingress via the aperture 710 and activate the active joint region 716. In a typical embodiment, the aperture 710 may be of various sizes, shapes, and types including, for example, a slot or an orifice. The substantially trapezoidal ridge 706 includes a tab 712 disposed at a top region of the aperture 710. In a typical embodiment, the tab 712 may be oriented, for example, at approximately a 135° angle relative to the aperture 710. The substantially trapezoidal ridge 706 terminates in an extended region 708 in the active joint region 716. The extended region 708 is utilized in joining the first tray section 730 and the second tray section 728 in a manner similar to that described above with respect to FIGS. 4A and 4B.

Still referring to FIG. 7, although only a single extended region 708 is visible downstream of the substantially trapezoidal ridge 706 in the side view, a plurality of extended regions 708 may be present in various embodiments and instrumental in forming the active joint region 716. In a typical embodiment, the first tray section 728, from downstream to upstream, is substantially planar and terminates in a truss 732 extending downwardly in the active joint region 716. The truss 732 directly opposes the downstream side 734 of the substantially trapezoidal ridge 706. A bottom portion of the downstream side 734 of the substantially trapezoidal ridge 706 and a top portion of the truss 732 make surface contact, which surface contact continues as the substantially trapezoidal ridge 706 and the truss 732 each angle orthogonally downstream. In this manner, more surface area of contact between the first tray section 728 and the second tray section 730 is enabled and a tight fluid seal 714 is achieved.

Referring now to FIG. 8, there is shown a side view of an active joint region according to an exemplary embodiment. In a typical embodiment, a tray 800 includes an active joint region 816 that is formed by joining a first tray section 828 with a second tray section 830. The heavier fluid 504 flows downstream and across the tray 800 from the second tray section 830 to the first tray section 828 as indicated. The second tray section 830, from upstream to downstream, is substantially planar until a substantially trapezoidal ridge 806 is formed thereon. In a typical embodiment, an aperture 810 is formed on a downstream side of the substantially trapezoidal ridge 806 to allow ascending lighter fluid 502 to ingress via the aperture 810 and activate the active joint region 816. In a typical embodiment, the aperture 810 may be of various sizes, shapes, and types including, for example, a slot or an orifice. In a typical embodiment, a tab 812 is disposed on a top portion of the aperture 810. The tab 812 is illustrated by way of example in FIG. 8 as being generally perpendicular to the aperture 810; however, one skilled in the art will recognize that the tab 812 may be oriented at any angle with respect to the aperture 810 including, for example the arrangements shown in FIG. 6 and FIG. 7.

In contrast to FIG. 7, an extended region 808 and the substantially trapezoidal ridge 806 are disposed on separate tray sections, namely, the first tray section 828 and the second tray section 830, respectively. The second tray section 830 is configured to receive the extended region 808 to create the active joint region 816. Additionally, on a downstream portion thereof, the second tray section 830 terminates in a truss 832 at a downstream portion of the active joint region 816. In various embodiments, aligned slots for permitting further ingression of the lighter fluid 502 into the active joint region 816 may be disposed on the first tray section 828 and the second tray section 830. For example, the aligned slots may be disposed in the first tray section 828 and the second tray section 830 immediately upstream of the truss 832. Aligned slots for permitting ingression of the lighter fluid 502 will be discussed in more detail below.

Referring now to FIG. 9, there is shown a side view of an active joint region according to an exemplary embodiment. In a typical embodiment, a tray 900 includes an active joint region 916 that is formed by joining a first tray section 928 with a second tray section 930. The heavier fluid 504 flows downstream and across the tray 900 from the second tray section 930 to the first tray section 928 as indicated. The second tray section 930, from upstream to downstream, is substantially planar until a substantially trapezoidal ridge 906 is formed thereon. In a typical embodiment, an aperture 910 is formed on a downstream side of the trapezoidal ridge 906 to allow ascending lighter fluid 502 to ingress via the aperture 910 and activate the active joint region 916. In a typical embodiment, the aperture 910 may be of various sizes, shapes, and types including, for example, a slot or an orifice. In a typical embodiment, a tab 912 is disposed on a top portion of the aperture 910. The tab 912 is illustrated by way of example in FIG. 9 as being generally perpendicular to the aperture 910; however, one skilled in the art will recognize that the tab 912 may be oriented at any angle with respect to the aperture 910 including, for example the arrangements shown in FIG. 6 and FIG. 7.

In contrast to FIG. 7, the second tray section 930 includes a first extended region 908 which terminates in a second extended region 920. In a typical embodiment, the second extended region 920 may be, for example, a tab, a protuberance, or any other appropriate shape. Further, the first tray section 928 includes a slot 918 that is configured to receive the second extended region 920. The second extended region 920 may be inserted into the slot 918 in order to securely lock together the first tray section 928 and the second tray section 930 in the active joint region 916.

Referring now to FIG. 10, there is shown a side view of an active joint region according to an exemplary embodiment. In a typical embodiment, a tray 1000 may be, for example, a sieve tray. The tray 1000 includes an active joint region 1016 that is formed by joining a first tray section 1028 with a second tray section 1030. In a typical embodiment, the first tray section 1028 and the second tray section 1030 are joined in a manner similar to that described with respect to FIGS. 4A and 4B. Furthermore, the first tray section 1028 and the second tray section 1030 are locked together in a manner similar to that described with respect to FIG. 9. More specifically, the first tray section 1028 terminates in a first extended region 1008 that includes a second extended region 1020. The second extended region 1020 is inserted into a slot 1018 to lock together the first tray section 1028 and the second tray section 1030. As shown, the active joint region 1016 is activated, for example, by inclusion of aligned lighter fluid slots 1010 in the first tray section 1028 and the second tray section 1030. The lighter fluid 502 is thus permitted to ascend and ingress into the active joint region 1016. In contrast to FIGS. 5-9, it is contemplated that flow of the heavier fluid 504 may either be across the active joint region 1016 as depicted in FIGS. 5-9 or, alternatively, be parallel to or along the active joint region 1016.

Referring now to FIG. 11, there is shown a side view of an active joint region according to an exemplary embodiment. In a typical embodiment, a tray 1100 includes an active joint region 1116 that is formed by joining a first tray section 1128 with a second tray section 1130. FIG. 11 depicts another method for locking together the first tray section 1128 and the second tray section 1130 in the active joint region 1116. In a typical embodiment, in contrast to FIG. 10, an extended region 1120 is disposed on the second tray section 1130 and a slot 1118 is disposed on the first tray section 1128. In construction of the tray 1100, after an extended region 1108 is inserted into a slot 1134 on the second tray section 1130 in a manner described in FIGS. 4A and 4B, the first tray section 1128 is lowered so that the first tray section 1128 receives the extended region 1120 in the slot 1118. In this way, the first tray section 1128 and the second tray section 1130 are locked together in the active joint region 1116. In a typical embodiment, the active joint region 1116 is rendered active by inclusion of aligned lighter fluid slots 1110 in the first tray section 1128 and the second tray section 1130. The lighter fluid 502 is thus permitted to ascend and ingress into the active joint region 1116.

Referring now to FIG. 12, there is shown a side view of an active joint region according to an exemplary embodiment. In a typical embodiment, a tray 1200 includes an active joint region 1216 that is formed by joining a first tray section 1228 with a second tray section 1230. The heavier fluid 504 flows downstream and across the tray 1200 from the second tray section 1230 to the first tray section 1228 as indicated. The second tray section 1230, from upstream to downstream, is substantially planar until a substantially trapezoidal ridge 1206 is formed thereon. In a typical embodiment, an aperture 1210 is formed on a downstream side of the trapezoidal ridge 1206 to allow ascending lighter fluid 502 to ingress via the aperture 1210 and activate the active joint region 1216. In a typical embodiment, the aperture 1210 may be of various sizes, shapes, and types including, for example, a slot or an orifice. In a typical embodiment, a tab 1212 is disposed on a top portion of the aperture 1210. The tab 1212 is illustrated by way of example in FIG. 12 as being generally perpendicular to the aperture 1210; however, one skilled in the art will recognize that the tab 1212 may be oriented at any angle relative to the aperture 1210 including, for example the arrangements shown in FIG. 6 and FIG. 7. In a typical embodiment, the first tray section 1228 and the second tray section 1230 are joined together by at least one locking mechanism 1222. In a typical embodiment, the locking mechanism 1222 may be, for example, a bolt, a screw, a pin, a rivet, or other appropriate fastener.

Referring now to FIG. 13, there is shown a side view of an active joint region according to an exemplary embodiment. In a typical embodiment, a tray 1300 includes an active joint region 1316 that is formed by joining an upper tray section 1328 with a lower tray section 1330. In a typical embodiment, the upper tray section 1328 includes an extended region 1308 that is inserted into and received by the lower tray section 1330. Moreover, as shown, a valve 1324 is mounted on a valve aperture 1336 on the lower tray section 1330. In a typical embodiment, the valve 1324 may be, for example, a fixed valve for strengthening the active joint region 1316. In alternative embodiments, a floating valve may also be utilized. A valve opening 1326 is disposed on the upper tray section 1328. In assembly of the tray 1300, the upper tray section 1328 is lowered so that the valve opening 1326 passes over the valve 1324 and the upper tray section 1328 becomes substantially flush with the lower tray section 1330.

Still referring to FIG. 13, the lighter fluid 502 is injected into the active joint region 1316 via the valve 1324 mounted over the valve aperture 1336. Accordingly, the lighter fluid 502 interacts with the heavier fluid 504. In a typical embodiment, flow of the heavier fluid 504 may be parallel to or along the active joint region 1316 details of which will be described in more detail below.

Referring now to FIG. 14, there is shown a side view of an active joint region according to an exemplary embodiment. In a typical embodiment, a tray 1400 includes an active joint region 1416 that is formed by joining an upper tray section 1428 with a lower tray section 1430. In a typical embodiment, the upper tray section 1428 includes an extended region 1408 that is inserted into and received by the lower tray section 1430. In contrast to the tray 1300 of FIG. 13, the valve 1326 is mounted on the upper tray section 1428, and a valve aperture 1436 is disposed on the lower tray section 1430. In a typical embodiment, the valve aperture 1436 aligns with the valve 1326 when the upper tray section 1428 and the lower tray section 1430 are assembled for purposes of allowing the lighter fluid 502 to be injected into the active joint region 1416. In a typical embodiment, a second extended region 1420 disposed on a first extended region 1408 of the lower tray section 1430 and a slot 1418 disposed on the upper tray section 1428 are utilized to lock together the upper tray section 1428 and the lower tray section 1430 in the active joint region 1416 in the manner described relative to FIG. 10.

Referring now to FIG. 15, there is shown a side view of an active joint region according to an exemplary embodiment. In a typical embodiment, a tray 1500 includes an active joint region 1516 that is formed by joining an upper tray section 1528 with a lower tray section 1530. In a typical embodiment, the upper tray section 1528 includes an extended region 1508 that is inserted into and received by the lower tray section 1330. In a typical embodiment, the tray 1500 differs from the tray 1300 (of FIG. 13) in that a lock valve 1524 is mounted on the lower tray section 1530. The valve opening 1326 is disposed on the upper tray section 1528. In assembly of the tray 1500, the upper tray section 1328 is lowered so that the valve opening 1326 passes over the lock valve 1524 and the upper tray section 1528 becomes substantially flush with the lower tray section 1530. The lock valve 1524 locks together the upper tray section 1528 with the lower tray section 1530, for example, by snapping the upper tray section 1528 in place.

Figure 16A:
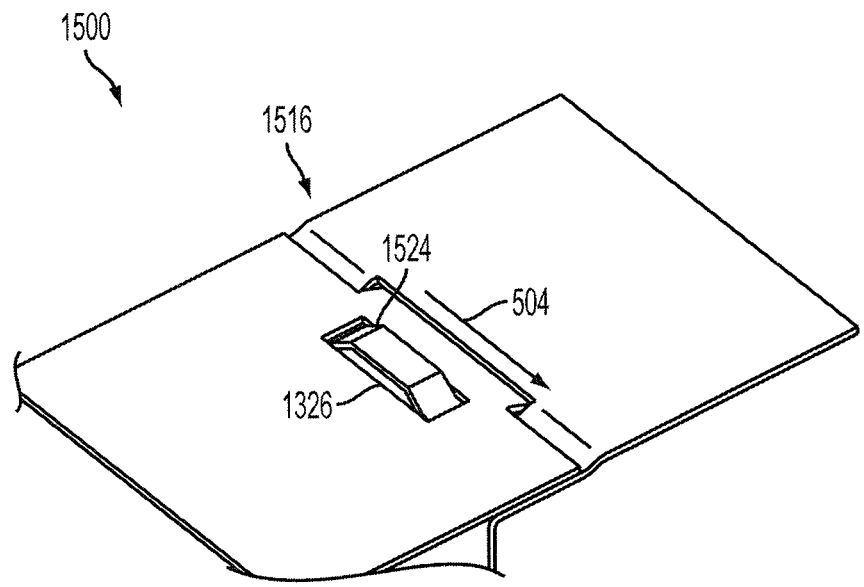
FIG. 16A is a top perspective view of a tray according to an exemplary embodiment.
Figure 16B:
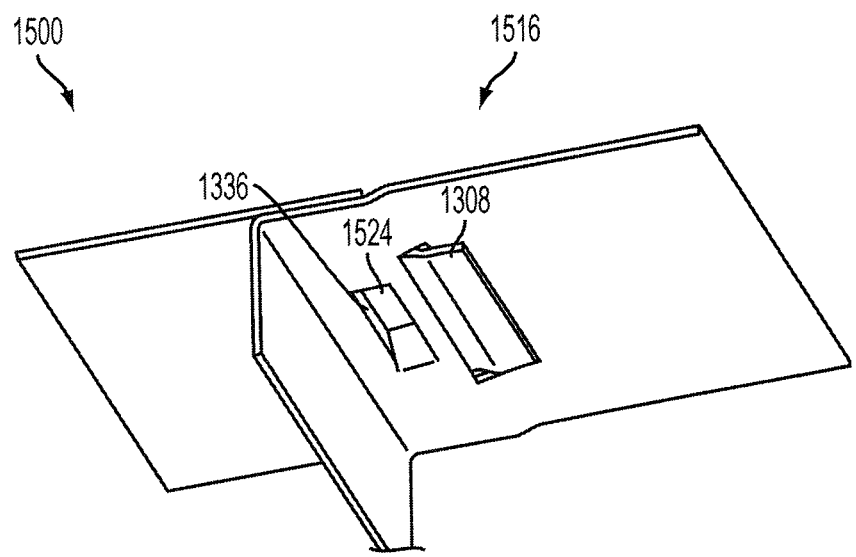
FIG. 16B is a bottom perspective view of a tray according to an exemplary embodiment.

Referring now to FIG. 16A, there is shown a top perspective view of a tray 1500 of FIG. 15 according to an exemplary embodiment. FIG. 16B is a bottom perspective view of the tray 1500 of FIG. 15.

Figure 17A:
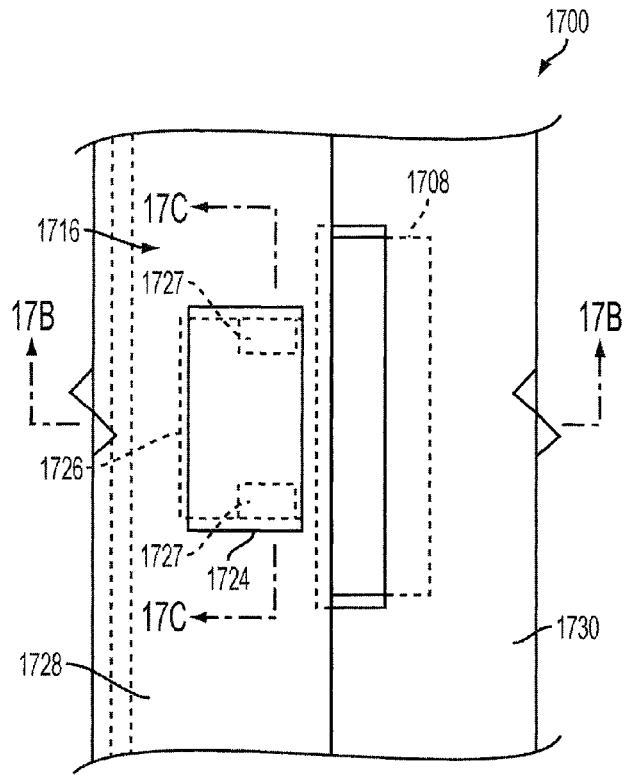
FIG. 17A is a top plan view of an active joint region according to an exemplary embodiment.
Figure 17B:
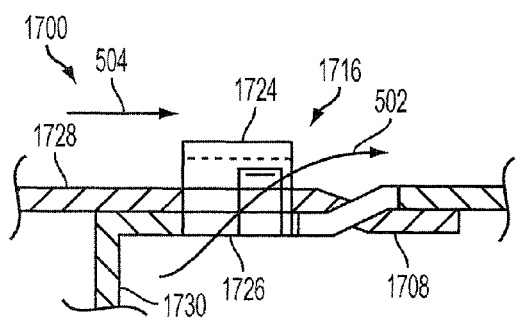
FIG. 17B is a cross-sectional view of the active joint region shown in FIG. 17A.
Figure 17C:
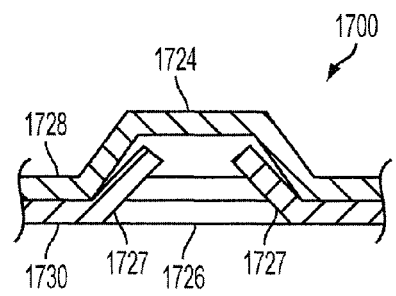
FIG. 17C is a cross-sectional view of the active joint region shown in FIG. 17A.

Referring now to FIGS. 17A through 17C there are shown various views of an active joint region according to an exemplary embodiment. In a typical embodiment, a tray 1700 includes an active joint region 1716 that is formed by joining an upper tray section 1728 with a lower tray section 1730. In a typical embodiment, the upper tray section 1728 includes an extended region 1708 that is inserted into and received by the lower tray section 1730. Moreover, as shown, a valve 1724 is mounted on the upper tray section 1728. In a typical embodiment, the valve 1724 may be, for example, a fixed valve for strengthening the active joint region 1716. In alternative embodiments, a floating valve may also be utilized. A valve opening 1726 is disposed on the lower tray section 1738. In a typical embodiment, the valve opening includes one or more flanges 1727 that extend upwardly from the lower tray section 1730. In assembly of the tray 1700, the upper tray section 1728 is lowered so that the valve o 1724 passes over the valve opening 1726 and the upper tray section 1728 becomes substantially flush with the lower tray section 1730. The pair of flanges 1727 engage an interior wall on the valve 1724 and provide a friction fit securing the upper tray section 1728 to the lower tray section 1730.

Still referring to FIG. 17A through 17C, the lighter fluid 502 is injected into the active joint region 1716 via the valve 1724 mounted over the valve opening 1726. Accordingly, the lighter fluid 502 interacts with the heavier fluid 504. In a typical embodiment, flow of the heavier fluid 504 may be parallel to or along the active joint region 1716 details of which will be described in more detail below.

It is thus believed that the operation and construction of the present invention will be apparent from the foregoing description. Although the method and apparatus shown or described has been characterized as being preferred it will be obvious that various changes and modifications may be made therein without departing from the spirit and scope of the invention as defined in the following claims. For example, flow of heavier fluid such as the heavier fluid 504 may be in various directions relative to an active joint region. By way of further example, the principles disclosed herein are applicable to various types of fractionation trays and liquid-liquid extraction trays including, for example, valve trays, sieve trays, and the like. Furthermore, the features discussed above with respect to FIGS. 1-16B may be combined and rearranged in numerous advantageous ways that will be apparent to one of ordinary skill in the art. For example, although specific embodiments are discussed herein that have various features such as lighter fluid slots, ridges, and thrust tabs, it is fully contemplated that other advantageous embodiments may have any combination of or even multiple instances of these features. Additionally, the valves referenced herein may, in some embodiments, be valves of the type discussed in U.S. patent application Ser. No. 12/408,333, filed Mar. 20, 2009, U.S. patent application Ser. No. 12/109,781, filed Apr. 25, 2008, and U.S. Provisional Patent Application No. 61/178, 676, filed May 15, 2009. Each of the aforementioned patent applications are incorporated herein by reference.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A fractionation tray for use in a process column of a type wherein a first fluid flows downwardly from a downcomer onto the fractionation tray and thereacross in a first direction, and through which a second fluid flows upwardly therethrough for interaction with the first fluid before passing therefrom, the fractionation tray comprising:
    an upper tray section;
    a lower tray section operable to removably engage the upper tray section;
    a boltless joint region comprising an area of overlap between the upper tray section and the lower tray section; and
    wherein the boltless joint region allows passage of the second fluid through the upper tray section while bypassing the lower tray section.

2. The fractionation tray of claim 1, wherein the joint region comprises a ridge having a plurality of apertures disposed thereon.

3. The fractionation tray of claim 2, wherein the ridge is substantially arc shaped.

4. The fractionation tray of claim 2, wherein the ridge is substantially trapezoidal shaped.

5. The fractionation tray of claim 2, wherein the ridge comprises a plurality of deflector tabs or vanes disposed proximate to the plurality of apertures.

6. The fractionation tray of claim 5, wherein at least one of the plurality of deflector tabs or vanes is disposed generally perpendicular to at least one of the plurality of apertures.

7. The fractionation tray of claim 5, wherein at least one of the plurality of deflector tabs or vanes is disposed generally at an angle greater than 90 degrees vertically or horizontally in a chosen direction relative to at least one of the plurality of apertures.

8. The fractionation tray of claim 1, wherein the upper tray section and the lower tray section are joined via a locking mechanism.

9. The fractionation tray of claim 1, wherein the upper tray section comprises at least one extended region operable to engage at least one slot on the lower tray section.

10. The fractionation tray of claim 9, wherein the at least one extended region comprises a first extended region and a second extended region disposed thereon.

11. The fractionation tray of claim 1, wherein the lower tray section comprises at least one extended region operable to engage at least one slot on the upper tray section.

12. The fractionation tray of claim 11, wherein the at least one extended region comprises a first extended region and a second extended region disposed thereon.

13. The fractionation tray of claim 1, wherein the upper tray section and the lower tray section are joined via a lock valve disposed on the lower tray section.

14. The fractionation tray of claim 1, wherein the upper tray section and the lower tray section are joined via a lock valve disposed on the upper tray section.

15. The fractionation tray of claim 1, wherein the joint region is substantially co-planar with the upper tray section and the lower tray section.

16. The fractionation tray of claim 1, wherein:
the upper tray section comprises a first plurality of slots;
the lower tray section comprises a second plurality of slots; and
at least a portion of the first plurality of slots is aligned with the second plurality of slots allowing ingress of the second fluid into a surface of the fractionation tray.

17. A fractionation tray for use in a process column of a type wherein a first fluid flows downwardly from a downcomer onto the fractionation tray and thereacross in a first direction, and through which a second fluid flows upwardly therethrough for interaction with the first fluid before passing therefrom, the fractionation tray comprising:
a first tray section, the first tray section comprising at least one extended region disposed thereon;
a second tray section, the second tray section comprising at least one slot for receiving the at least one extended region to form a joint region, the joint region comprising an area of overlap between the first tray section and the second tray section; and
a ridge formed in the first tray section at the joint region, the ridge comprising at least one aperture disposed thereon for allowing the second fluid to ingress into a surface of the fractionation tray while bypassing the second tray section.

18. The fractionation tray of claim 17, wherein the ridge comprises at least one deflector tab or vane disposed proximate to the at least one aperture.

19. The fractionation tray of claim 18, wherein the at least one deflector tab or vane is oriented generally perpendicular to the at least one aperture.

20. The fractionation tray of claim 18, wherein the at least one deflector tab or vane is oriented generally at an angle greater than 90 degrees vertically or horizontally in a chosen direction relative to the at least one aperture.

21. The fractionation tray of claim 17, wherein the ridge is substantially arc shaped.

22. The fractionation tray of claim 17, wherein the ridge is substantially trapezoidal shaped.

23. A fractionation tray for use in a process column of a type wherein a first fluid flows downwardly from a downcomer onto the fractionation tray and thereacross in a first direction, and through which a second fluid flows upwardly therethrough for interaction with the first fluid before passing therefrom, the fractionation tray comprising:
an upper tray section comprising a first plurality of slots disposed thereon;
a valve opening formed on the upper tray section;
a lower tray section comprising a second plurality of slots disposed thereon, the lower tray section operable to removably engage the upper tray section to form a joint region, the joint region comprising an area of overlap between the upper tray section and the lower tray section;
a valve disposed on the lower tray section, the valve being received by the valve opening; and
wherein at least a portion of the first plurality of slots is aligned with at least a portion of the second plurality of slots thereby allowing the second fluid to ingress into a surface of the fractionation tray.

24. The fractionation tray of claim 23, wherein the upper tray section and the lower tray section are joined via a locking mechanism.

25. The fractionation tray of claim 24, wherein the locking mechanism comprises at least one of a bolt, a screw, a pin, a rivet, or chosen fastener.

26. The fractionation tray of claim 23, wherein the upper tray section comprises at least one extended region operable to engage at least one slot on the lower tray section.

27. The fractionation tray of claim 23, wherein the lower tray section comprises at least one extended region operable to engage at least one slot on the upper tray section.

28. The fractionation tray of claim 23, wherein the joint region comprises a ridge.

29. The fractionation tray of claim 23, wherein the joint region is substantially co-planar with the first and second tray sections.

30. The fractionation tray of claim 23, wherein the upper and lower tray sections are joined via a lock valve disposed on the lower tray section.

31. The fractionation tray of claim 23, wherein the upper and lower tray sections are joined via a lock valve disposed on the upper tray section.

32. A fractionation tray for use in a process column of a type wherein a first fluid flows downwardly from a downcomer onto the fractionation tray and thereacross in a first direction, and through which a second fluid flows upwardly therethrough for interaction with the first fluid before passing therefrom, the fractionation tray comprising:
an upper tray section;
a lower tray section comprising at least one joint locking aperture disposed thereon, the at least one joint locking aperture disposed on the lower tray section, the at least one joint locking aperture operable to removably engage and fasten the upper tray section to the lower tray section;
a boltless joint region comprising an area of overlap between the upper tray section and the lower tray section; and
wherein the boltless joint region allows passage of the second fluid through the at least one joint locking aperture.

33. The fractionation tray of claim 32, wherein the joint locking aperture comprises a lock valve.

34. The fractionation tray of claim 32, wherein the joint region is substantially co-planar with the upper tray section and the lower tray section.

35. The fractionation tray of claim 32, wherein:
the upper tray section comprises a first plurality of slots;
the lower tray section comprises a second plurality of slots; and
at least a portion of the first plurality of slots is aligned with the second plurality of slots allowing ingress of the second fluid into a surface of the fractionation tray.

* * * * *